3,462,495
METHOD FOR PREPARING ETHER KETONES
AND ETHER ALDEHYDES
Hans R. Friedli, Midland, Mich., assignor to The Dow Chemical Company, Midland, Mich., a corporation of Delaware
No Drawing. Filed Oct. 31, 1966, Ser. No. 590,479
Int. Cl. C07c 49/82, 45/10
U.S. Cl. 260—590                     5 Claims The present invention relates to a novel method for preparing alkoxy and aryloxy aldehydes and ketones from glycol monoethers. More particularly, the present invention concerns the preparation of aldehydes and ketones from glycol ethers having the formula R—O—(alkylenoxy)$_n$H where R represents an aliphatic having from 1 to 6 carbon atoms, cyclohexyl or cyclopentyl group phenyl or alkyl phenyl group, the alkylenoxy group may be ethoxy, propoxy or butoxy and $n$ is an interger from 1 to 3. The alkylenoxy groups may be in any of their possible isomeric forms and the alkanol may be primary or secondary.

In accordance with the process of the present invention, the monoglycol ethers are converted to their corresponding ether ketone or aldehyde and the polyglycol ethers are cracked to their simplest ether ketone or aldehyde.

The process of the present invention comprises passing a mole of glycol monoether in admixture with from 4 to 25 moles of water into a preheater wherein the entire feed is vaporized and heated to between about 350° and 450° C. at atmospheric, subatmospheric or superatmospheric pressure. The glycol ether is fed at a vapor velocity of from about 100 to 800 volumes of glycol ether per volume of catalyst per hour (STP). It is to be understood, however, that the above variables are not independent of each other and that variation of one of the variables might require an adjustment of the others. It is to be understood that within the above set forth operative ranges of conditions, there are preferred operating conditions. Thus, it is preferable to employ a space velocity of from 350 to 450 volumes of glycol ether per volume of catalyst per hour; steam ratio of 15 to 25 moles of steam per mole of glycol ether and a temperature of 420° to 430° C. The vaporized feed mixture at the desired temperature is passed over the catalyst bed and the gases exiting from the reactor condensed.

The catalyst which has been found suitable for carrying out the dehydrogenation reaction is calcium nickel phosphate. The method of making the same is described in U.S. Patent Nos. 2,456,367, 2,456,368 and 2,542,813. The catalyst comprises a co-precipitated calcium nickel phosphate containing an average of from 7.5 to 9.2 atoms of calcium per atom of nickel, the total amount of calcium and nickel being sufficient to satisfy the valences of the phosphate ion. The calcium nickel phosphate is precipitated from a neutral to basic aqueous medium. The catalyst is preferably prepared by adding a solution of calcium and nickel salts (containing from 7.5 to 9.2 and preferably from 8.2 to 9.0 atoms of calcium per atom of nickel) to a solution of a soluble phosphate while maintaining the resultant mixture in a neutral or preferably alkaline condition. Alternatively, the catalyst may be prepared by adding an aqueous solution of phosphoric acid and the calcium and nickel salts to an aqueous solution of an alkali, preferably ammonia. The calcium nickel phosphate which forms precipitates as an approximately normal salt of phosphoric acid. The precipitate is separated from the liquor and is washed with water. The washing should be carried out so as to remove as thoroughly as possible readily soluble nickel compounds and any chlorides from the product, since such nickel containing impurities have a catalytic action on the thermal decomposition of hydrocarbons other than that of the desired catalyst and since chlorides, if retained in the catalyst, tend to deactivate the latter. After being washed with water, the product is dried, usually at temperatures between 60° and 150° C. The dried product is a hard gel usually of yellowish color. The gel may be crushed or otherwise reduced to granules, or small lumps and can be used directly in such a form as a dehydrogenation catalyst; however, it is usually pressed into the form of pellets for more convenient use. Frequently a minor amount of chromium oxide is admixed with the calcium nickel phosphate, e.g. prior to, or during, formation of the pellets. The catalyst thus may consist of the calcium nickel phosphate, or may comprise the calcium nickel phosphate and a minor amount (usually less than about 10 percent) of chromium oxide. For convenience, all such catalysts are herein referred to as "calcium nickel phosphate."

It is also to be understood that periodically the catalyst bed must be regenerated by burning off accumulated carbonaceous material. This is preferably accomplished by passing oxygen or air through the catalyst bed with steam to maintain the temperature at about 450° C. The steam-air space velocities for half-hour regeneration periods following one-hour on-steam periods are 800 and 400 volumes each of steam and air per volume of catalyst per hour. These values are not critical as long as they provide a complete regeneration during the regeneration period.

The glycol monoethers which are employed in the process of the present invention are the methyl, ethyl, propyl, butyl, pentyl, cyclopentyl, hexyl, cyclohexyl, phenyl and alkylphenyl monoethers of ethylene glycol, propylene glycol, butylene glycol and their di- and trimers including mixtures thereof.

While it is to be understood that the operative limits set forth above are well within the conditions wherein some ether ketones and ether aldehydes are produced, operation much outside these limits is accompanied by low conversion or high by-product formation.

The following examples illustrate the present invention but are not to be construed as limiting:

Example 1

1-methoxy-2-propanol was premixed with water in an amount to provide a molar ratio of glycol ether to water of 1 to 25 and fed to a preheater section of a stainless steel reactor having a catalyst bed of pelletized "calcium nickel phosphate" provided with chromium oxide. This catalyst had been previously activated by an air-steam treatment at 650° C. The feed mixture was heated to 425° C., the pressure was essentially atmospheric. The preheated feed was fed to the catalyst chamber at a space velocity of 200 volumes of glycol ether (STP) per hour per volume of catalyst. The feed was interrupted every hour and air and steam were fed to the catalyst chamber with space velocities of 400 and 800, respectively, for one half-hour. This procedure regenerates the catalyst by burning off carbonaceous deposits which might be laid down during the glycol ether dehydrogenation reaction and restores its original activity. This cycle (dehydrogenation-regeneration) was repeated several times and the products passed through ice traps and Dry Ice traps to separate the reaction products from the hydrogen. The material collected in the traps was distilled to recover a product containing unreacted 1-methoxy-2-propanol, 1-methoxy-2-propanone and some by-products. The conversion of 1-methoxy-2-propanol was 55% and the yield to 1-methoxy-2-propanone was 72.5%, the rest being products from dehydration and cleavage reactions.

Example 2

Dipropyleneglycol methyl ether (major isomer: 1-(2-methoxy-1-methyl-ethoxy)-2-propanol) was treated in a manner similar to that described in Example 1 using 19.2 moles of steam per mole of glycol ether, a temperature of 425° C. and a space velocity (STP) of glycol ether of 206. The conversion of the starting material was 66% and the yield of 1-methoxy-2-propanone was 7.2% and that of 1-methoxy-2-propanol was 31.9%.

Example 3

Using the procedure of Example 1 and replacing 1-methoxy-2-propanol by 2-methoxy-ethanol and employing 20.7 volumes of steam per mole of reactant, a temperature of 440° C. and a space velocity (STP) of 191 for the 1-methoxy-2-ethanol, the following results were obtained: conversion of 2-methoxy-ethanol—54.0%; yield of methoxy acetaldehyde—6.0%.

Example 4

1-phenoxy-2-propanol was dehydrogenated according to the procedure described in Example 1. The temperature was 420° C., the space velocity (STP) of the reactants was 201, and 19.5 moles of steam were fed per mole of 1-phenoxy-2-propanol. The conversion obtained under these conditions was 91.4% and the yield of 1-phenoxy-2-propanone was 11.5%.

I claim:

1. A process for dehydrogenating glycol monoethers to prepare their corresponding ketones and aldehydes which comprises dehydrogenating and as necessary, cracking an alkoxy propanol having the formula:

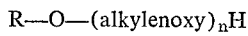

R—O—(alkylenoxy)$_n$H wherein R represents an alkyl group having from 1 to 6 carbon atoms, cyclohexyl, cyclopentyl, phenyl group, or alkyl phenyl group, $n$ represents an integer from 1 to 3 and alkylenoxy represents an alkylenoxy radical having from 2 to 4 carbon atoms, by passing said glycol ether into and through a calcium nickel phosphate catalyst while simultaneously passing water in the form of vapor along with the glycol ether, said water and glycol ether being supplied in a mole ratio of from 4 to 1 to 25 to 1 respectively and at a space velocity of glycol ether of from 100 to 800 volumes per volume of catalyst per hour at a temperature of from 350° C. to 450° C., said catalyst being a co-precipitated calcium nickel phosphate containing an average of 7.5 to 9.2 atoms of calcium per atom of nickel, the total amount of calcium and nickel being sufficient to satisfy the valences of the phosphate ion prepared by reacting under neutral or alkaline conditions a soluble phosphate or an aqueous solution of phosphoric acid with a solution of calcium and nickel salts wherein the said co-precipitated calcium-nickel phosphate is washed and dried at temperatures between 60° and 150° C.

2. In the process of claim 1 wherein said glycol ether is 1-methoxy-2-propanol.

3. In the process of claim 1 wherein said glycol ether is dipropylene glycol methyl ether.

4. In the method of claim 1 wherein said glycol ether is 1-methoxy-2-ethanol.

5. In the method of claim 1 wherein said glycol ether is 1-phenoxy-2-propanol.

References Cited

UNITED STATES PATENTS

| | | | |
|---|---|---|---|
| 1,949,412 | 3/1934 | Dreyfus | 260—596 |
| 2,442,320 | 5/1948 | Britton et al. | 252—437 |
| 3,149,081 | 9/1964 | Bowman et al. | 260—596 |
| 3,149,082 | 9/1964 | Bowman et al. | 260—596 |
| 2,915,532 | 12/1959 | Walton | 260—590 |

DANIEL D. HORWITZ, Primary Examiner

U.S. Cl. X.R.

252—437; 260—586, 594, 596, 600, 602